US010904719B2

(12) United States Patent
Cao

(10) Patent No.: US 10,904,719 B2
(45) Date of Patent: Jan. 26, 2021

(54) MESSAGE SHUNTING METHOD, DEVICE AND SYSTEM BASED ON USER MODE PROTOCOL STACK

(71) Applicant: ADVANCED NEW TECHNOLOGIES CO., LTD., Grand Cayman (KY)

(72) Inventor: Lin Cao, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

(21) Appl. No.: 16/827,118

(22) Filed: Mar. 23, 2020

(65) Prior Publication Data
US 2020/0245106 A1 Jul. 30, 2020

Related U.S. Application Data

(63) Continuation of application No. PCT/CN2020/072074, filed on Jan. 14, 2020.

(30) Foreign Application Priority Data

May 6, 2019 (CN) .......................... 2019 1 0372260

(51) Int. Cl.
G06F 15/16 (2006.01)
H04W 4/14 (2009.01)
(Continued)

(52) U.S. Cl.
CPC ............... H04W 4/14 (2013.01); H04L 51/38 (2013.01); H04L 63/0428 (2013.01);
(Continued)

(58) Field of Classification Search
CPC ....... H04W 4/14; H04W 80/02; H04W 80/10; H04W 88/184; H04L 51/38; H04L 63/0428; H04L 69/18; H04L 67/32
See application file for complete search history.

(56) References Cited

U.S. PATENT DOCUMENTS 7,107,348 B2  9/2006  Shimada et al.
8,634,415 B2  1/2014  Srinivasan et al.
(Continued)

FOREIGN PATENT DOCUMENTS

CN  101867558 A  10/2010
CN  102035743 A  4/2011
(Continued)

OTHER PUBLICATIONS

First Search of CN Application No. 201910372260.4 dated Apr. 7, 2020, (1 page).
(Continued)

Primary Examiner — Ryan J Jakovac

(57) ABSTRACT

Methods, systems, and apparatus, including computer programs encoded on computer storage media, for message distribution based on a user mode protocol stack are provided. One of the methods includes: receiving an application service data message from a message transceiver; determining, from a plurality of user mode protocol stacks, a user mode protocol stack corresponding to the received application service data message according to correspondences between a plurality of application services and the plurality of user mode protocol stacks, wherein each of the plurality of user mode protocol stacks corresponds to an instance; and sending the application service data message to an instance of the determined user mode protocol stack, to cause the instance of the determined user mode protocol stack to process the received application service data message and to
(Continued)

send the processed application service data message to an application service corresponding to the determined user mode protocol stack.

20 Claims, 5 Drawing Sheets

(51) Int. Cl.
    *H04W 88/18*           (2009.01)
    *H04L 12/58*           (2006.01)
    *H04L 29/06*           (2006.01)
    *H04W 80/02*           (2009.01)
    *H04W 80/10*           (2009.01)

(52) U.S. Cl.
    CPC ............. *H04L 69/18* (2013.01); *H04W 80/02* (2013.01); *H04W 80/10* (2013.01); *H04W 88/184* (2013.01)

(56) References Cited

U.S. PATENT DOCUMENTS

| | | | |
|---|---|---|---|
| 9,143,909 | B2 | 9/2015 | Kumar et al. |
| 9,356,866 | B1 | 5/2016 | Sivaramakrishnan et al. |
| 10,057,735 | B2 | 8/2018 | Sah et al. |
| 10,241,830 | B2 | 3/2019 | Gu et al. |
| 2010/0262650 | A1 | 10/2010 | Chauhan et al. |
| 2010/0284404 | A1 | 11/2010 | Gopinath et al. |
| 2014/0136680 | A1 | 5/2014 | Joshi et al. |
| 2015/0117420 | A1* | 4/2015 | Raman ................ H04L 61/2015 370/338 |
| 2015/0381415 | A1 | 12/2015 | Burckart et al. |
| 2016/0105364 | A1 | 4/2016 | Kanonakis et al. |
| 2018/0027079 | A1 | 1/2018 | Ben Ali et al. |
| 2019/0319894 | A1* | 10/2019 | Tang ................... H04L 47/6215 |

FOREIGN PATENT DOCUMENTS

| | | |
|---|---|---|
| CN | 102088457 A | 6/2011 |
| CN | 102246489 B | 5/2014 |
| CN | 104142867 A | 11/2014 |
| CN | 102549984 B | 4/2015 |
| CN | 104951357 A | 9/2015 |
| CN | 105245271 A | 1/2016 |
| CN | 106850565 A | 6/2017 |
| CN | 104142867 B | 1/2018 |
| CN | 107948087 A | 4/2018 |
| CN | 104904160 B | 6/2018 |
| CN | 108111558 A | 6/2018 |
| CN | 108270813 A | 7/2018 |
| CN | 109379303 A | 2/2019 |
| CN | 110278161 A | 9/2019 |
| EP | 2647174 B1 | 8/2018 |
| WO | 2015113435 A1 | 8/2015 |
| WO | 2015143904 A1 | 10/2015 |
| WO | 2018015860 A1 | 1/2018 |

OTHER PUBLICATIONS

First Office Action of CN Application No. 201910372260.4 dated Apr. 17, 2020, (16 page).
Supplementary Search for Chinese Application No. 201910372260.4 dated Jun. 4, 2020.
Written Opinion and International Search Report for PCT Application No. PCT/CN2020/072074 made available to public dated Nov. 12, 2020.

* cited by examiner

MESSAGE SHUNTING METHOD, DEVICE AND SYSTEM BASED ON USER MODE PROTOCOL STACK

CROSS-REFERENCE TO RELATED APPLICATIONS

The present application is a continuation application of International Patent Application No. PCT/CN2020/072074, filed on Jan. 14, 2020, which is based on and claims priority to the Chinese Patent Application No. 201910372260.4, filed on May 6, 2019 and entitled "MESSAGE SHUNTING METHOD, DEVICE AND SYSTEM BASED ON USER MODE PROTOCOL STACK." The above-referenced applications are incorporated herein by reference in their entirety.

TECHNICAL FIELD

The embodiments of the specification relate to the computer field, and in particular, to a method, apparatus, and system for message distribution based on a user mode protocol stack.

BACKGROUND

A user mode, which is an operating level of an operating system, corresponds to a kernel mode. The user mode is a privileged level at which an ordinary user process operates; and most applications accessible to users operate in the user mode. A Transmission Control Protocol/Internet Protocol (TCP/IP protocol) stack is a sum of a series of network protocols and also is a core framework for network communication, which defines how a terminal is connected to the Internet and how data is transmitted therebetween. A user mode protocol stack is a TCP/IP protocol stack operating in a user mode. How to efficiently process a message based on the user mode protocol stack is a technical issue to be considered.

SUMMARY

The embodiments of the specification provide a method, apparatus, system, server, and a storage medium for message distribution based on a user mode protocol stack.

According to a first aspect, the embodiments of the specification provide a method for message distribution based on a user mode protocol stack. The method may include: receiving an application service data message from a message transceiver; determining, from a plurality of user mode protocol stacks, a user mode protocol stack corresponding to the received application service data message according to correspondences between a plurality of application services and the plurality of user mode protocol stacks, wherein each of the plurality of user mode protocol stacks corresponds to an instance; and sending the application service data message to an instance of the determined user mode protocol stack, to cause the instance of the determined user mode protocol stack to process the received application service data message and to send the processed application service data message to an application service corresponding to the determined user mode protocol stack.

In some embodiments, the method may further include: pre-setting a plurality of mapping numbers for the plurality of user mode protocol stacks corresponding to the plurality of application services.

In some embodiments, determining, from a plurality of user mode protocol stacks, a user mode protocol stack corresponding to the received application service data message according to correspondences between a plurality of application services and the plurality of user mode protocol stacks may include: computing a hash value of a field in the application service data message; obtaining a mapping number of a user mode protocol stack based on the hash value; and determining, from the plurality of user mode protocol stacks, the user mode protocol stack corresponding to the application service data message based on the obtained mapping number and the plurality of pre-set mapping numbers of the plurality of user mode protocol stacks.

In some embodiments, determining, from a plurality of user mode protocol stacks, a user mode protocol stack corresponding to the received application service data message according to correspondences between a plurality of application services and the plurality of user mode protocol stacks may include: computing a hash value for an IP 5-tuple in the application service data message; obtaining a mapping number based on the hash value; and determining, from the plurality of user mode protocol stacks, the user mode protocol stack corresponding to the application service data message based on the obtained mapping number and the plurality of pre-set mapping numbers of the plurality of user mode protocol stacks.

In some embodiments, determining, from a plurality of user mode protocol stacks, a user mode protocol stack corresponding to the received application service data message according to correspondences between a plurality of application services and the plurality of user mode protocol stacks may include: computing a hash value for a port number in the application service data message; obtaining a plurality of mapping numbers based on the hash value; and determining, from the plurality of user mode protocol stacks, a plurality of target user mode protocol stacks corresponding to the application service data message based on the obtained mapping numbers and the plurality of pre-set mapping numbers of the plurality of user mode protocol stacks.

In some embodiments, the method may further include: receiving an Address Resolution Protocol (ARP) data message from the message transceiver; if the ARP data message is an ARP request message, randomly submitting the ARP request message to an instance of any of the plurality of user mode protocol stacks for processing; and if the ARP data message is an ARP response message or a free ARP message, for an instance of each of the plurality of user mode protocol stacks, duplicating the ARP response message or the free ARP message and modifying a destination link address of the duplicated ARP response message or free ARP message to be a broadcast address.

In some embodiments, determining, from a plurality of user mode protocol stacks, a user mode protocol stack corresponding to the received application service data message according to correspondences between a plurality of application services and the plurality of user mode protocol stacks may include: determining an application service corresponding to the received application service data message.

According to a second aspect, the embodiments of the specification provide a system for message distribution based on a user mode protocol stack. The system may include: one or more processors and one or more non-transitory computer-readable memories coupled to the one or more processors and configured with instructions executable by the one or more processors to cause the apparatus to perform operations comprising: receiving an application service data message from a message transceiver; determining, from a plurality of user mode protocol stacks, a user mode protocol stack corresponding to the received application service data message according to correspondences between a plurality of application services and the plurality of user mode protocol stacks, wherein each of the plurality of user mode protocol stacks corresponds to an instance; and sending the application service data message to an instance of the determined user mode protocol stack, to cause the instance of the determined user mode protocol stack to process the received application service data message and to send the processed application service data message to an application service corresponding to the determined user mode protocol stack.

According to a third aspect, the embodiments of the specification provide a non-transitory computer-readable storage medium for message distribution based on a user mode protocol stack. The non-transitory computer-readable storage medium may be configured with instructions executable by one or more processors to cause the one or more processors to perform operations comprising: receiving an application service data message from a message transceiver; determining, from a plurality of user mode protocol stacks, a user mode protocol stack corresponding to the received application service data message according to correspondences between a plurality of application services and the plurality of user mode protocol stacks, wherein each of the plurality of user mode protocol stacks corresponds to an instance; and sending the application service data message to an instance of the determined user mode protocol stack, to cause the instance of the determined user mode protocol stack to process the received application service data message and to send the processed application service data message to an application service corresponding to the determined user mode protocol stack.

The embodiments of the specification have the following benefits. In the embodiments of the specification, each instance corresponds to a different user mode protocol stack. Therefore, when instances process messages, the messages can be processed based on resources of different user mode protocol stacks. Accordingly, mutual exclusion of the resources due to the fact that multiple instances correspond to the same user mode protocol stack can be avoided, and a heterogeneous ability can be improved. Moreover, the instances belong to different user mode protocol stacks respectively, thereby enabling a suitable user mode protocol stack to be selected for an application service, and improving the performance of the application service.

DETAILED DESCRIPTION

For a better understanding, the specification are described in detail below in combination with the accompanying drawings and embodiments. The embodiments of the specification and features in the embodiments are detailed descriptions of the specification, rather than limiting the specification. The embodiments of the specification can be mutually combined, as well as the features of the embodiments, if no conflict exists.

Firstly, technical terminologies involved in the embodiments of the specification are explained as follows.

User mode protocol stack. A protocol stack is a module included in a network processing portion of an operating system. When a process or thread related to the network processing portion operates in a user space, the protocol stack to which a CPU stack pointer register points is a user mode protocol stack. In the embodiments of the specification, the user mode protocol stack can be deemed as a TCP/IP protocol stack operating in a user mode.

Instance. In the field of computer, a "class" is referred to as an "instance" after instantiation. The "class" is static and does not occupy process memory, whereas the "instance" occupies dynamic memory. In the embodiments of the specification, the instance refers to a thread or process operating on a user mode protocol stack.

Heterogeneous ability. Heterogeneous computing technology is parallel and distributed computing technology, which enables a parallelism type (code type) of a computing task to best match a computing type that a machine can effectively support (namely a machine ability), and which sufficiently utilizes various computing resources. In the embodiments of the specification, the heterogeneous ability refers to an ability of operating different user mode protocol stacks among instances.

Message distribution processor. A message distribution processor refers to a software that classifies messages and processes the messages according to types thereof. In the embodiments of the specification, the message distribution processor may classify messages, to determine a user mode protocol stack suitable for the message type, thereby implementing the distribution of various messages to instances of corresponding user mode protocol stacks; the message type is classified according to various application services. In other words, the various messages correspond to the various application services.

Based on meanings of the above-described technical terminologies, the embodiments of the specification are described in detail.

Figure 1:
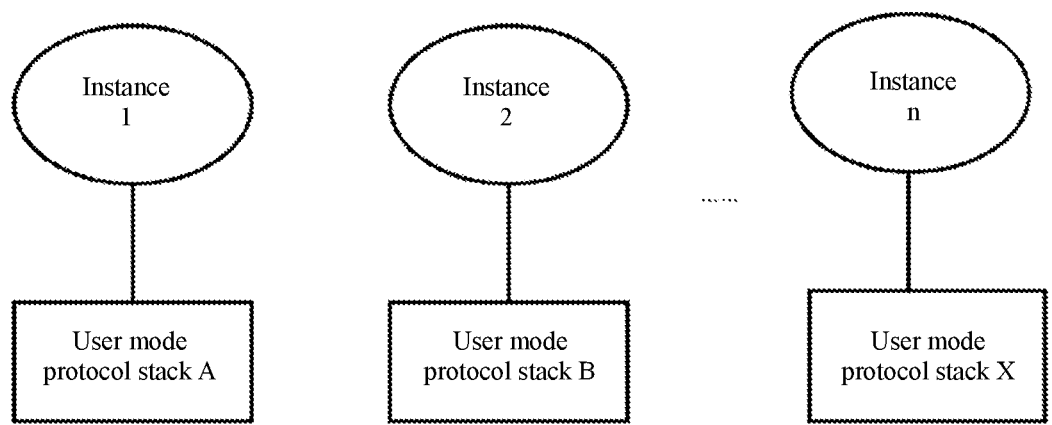
FIG. 1 shows a schematic diagram of a correspondence between a user mode protocol stack and an instance according to some embodiments of the specification.

Those skilled in the art should understand that for an application service (APP) based on a user mode protocol stack, if multiple instances jointly belong to one protocol stack, mutual exclusion of resources may be caused, resulting in limited performance of the application service and an insufficient heterogeneous ability. Therefore, in the embodiments of the specification, various instances are set to belong to different user mode protocol stacks respectively. FIG. 1 shows a schematic diagram of a correspondence between a user mode protocol stack and an instance according to some embodiments of the specification. In the schematic diagram, each user mode protocol stack corresponds to one instance. In FIG. 1, a user mode protocol stack A corresponds to an instance 1; a user mode protocol stack B corresponds to an instance 2, . . . ; and a user mode protocol stack X corresponds to an instance n. Thus, the user mode protocol stacks are in one-to-one correspondence with the instances, so as to support a suitable user mode protocol stack to be selected for an application service (rather than having multiple instances jointly belong to one user mode protocol stack). As there is no mutual exclusion of resources among the instances of the user mode protocol stacks, the performance of the application service is enhanced.

Figure 2:
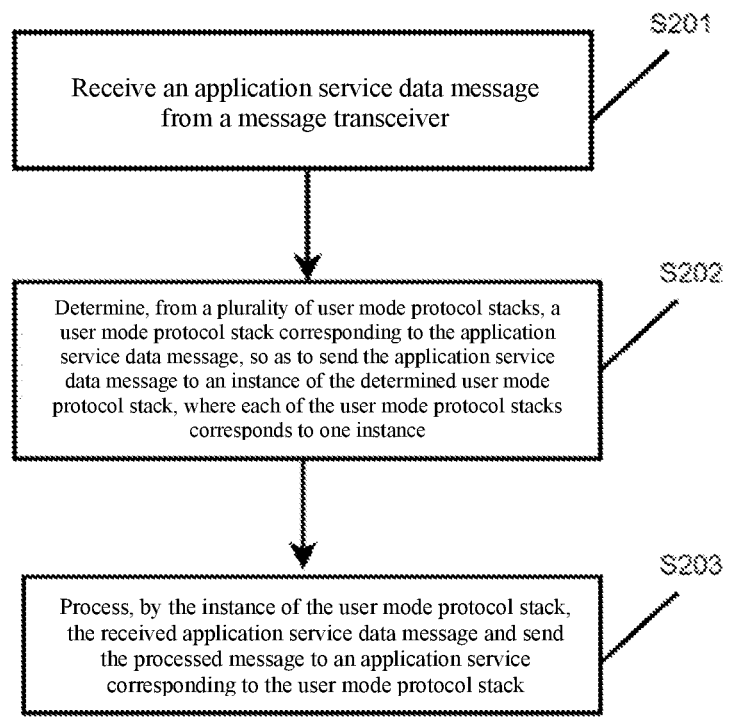
FIG. 2 shows a flow chart of a method for message distribution based on a user mode protocol stack according to some embodiments of the specification.

The embodiments of the specification provide a method for message distribution based on a user mode protocol stack. Referring to FIG. 2, the method for message distribution based on a user mode protocol stack comprises steps S201 to S203.

In step S201: the method includes receiving an application service data message from a message transceiver.

A message transceiver may be a hardware unit that receives and sends network messages. The message transceiver receives messages from devices such as client devices in a message receiving direction, and then submits the messages to one or more message distribution processors for processing.

In the step S201, the message distribution processor receives the message from the message transceiver. In some embodiments, the message distribution processor receives various types of messages from the message transceiver, for example, including but not limited to, application service data messages and protocol data messages. An application service data message may be a data message related to an application service, and may further include a data message to be processed by the application service and a correspondingly connected protocol message; and the protocol data message refers to any non-application service data message.

As described above, in order to improve service provision performance of the application service, a method is provided to enable a suitable user mode protocol stack to be selected for an application service. In some embodiments, an application service data message corresponding to an application service may be mapped to a user mode protocol stack corresponding to the application service, and the application service data message is processed by an instance of the user mode protocol stack.

After receiving the various types of messages from the message transceiver, the message distribution processor classifies the messages into application service data messages and protocol data messages according to content of the messages (for example, according to a message type field in the content of the messages). In some embodiments, with regard to the application service data message, the message distribution processor may implement subsequent steps so as to classify and distribute the application service data message to the user mode protocol stack corresponding to the application service of the application service data message.

In the step S202: the method includes determining, from a plurality of user mode protocol stacks, a user mode protocol stack corresponding to the application service data message so as to send the application service data message to an instance of the determined user mode protocol stack, where each of the user mode protocol stacks corresponds to one instance.

After receiving the various types of messages from the message transceiver, the message distribution processor may extract application service data messages according to the content of the messages, and select a suitable user mode protocol stack for each of the application service data messages.

In some embodiments, the step of determining a user mode protocol stack corresponding to the application service data message may comprise: (1) determining an application service corresponding to the application service data message; (2) obtaining a preset correspondence between the application service and the user mode protocol stack; and (3) determining a user mode protocol stack corresponding to the application service data message according to a correspondence between the application service data message and the application service and a correspondence between the application service and the user mode protocol stack.

For example, the application service corresponding to the application service data message may be determined. Those skilled in the art understand that a message is a network transmission unit; during transmission, messages are continuously encapsulated into groups, packets, and frames for transmission. An encapsulation method is to add some information segments (fields) which are data of a message header organized in some format. For example, the fields include information such as a message type, a message version, a message length, a message entity, etc. The message distribution processor analyzes the application service data message, and determines the application service corresponding to the message according to the various fields in the header of the message. For example, the application service corresponding to the application service data message is determined according to fields such as a message type, a message destination address, etc.

The preset correspondence between the application service and the user mode protocol stack may be obtained. In order to improve service provision performance of the application service, a method is adopted to enable a suitable user mode protocol stack to be selected for the application service; in other words, each application service has a correspondence with one or more user mode protocol stacks. On the message distribution processor, in order for the application service data message to be distributed to the user mode protocol stack corresponding to the application service, the correspondence between the application service and the user mode protocol stack may be obtained. For example, information of the correspondence between the application services and the user mode protocol stacks can be stored and updated in a module on the message distribution processor, or can be stored and updated on a server. The message distribution processor obtains the information of the correspondence from the server. The stored information of the correspondence may be synchronized with the correspondence to ensure information accuracy.

Since the application service corresponding to the application service data message and the correspondence between the application service and the one or more user mode protocol stacks are obtained, which user mode protocol stack or stacks corresponds or correspond to the application service data message can be determined.

For example, assuming that the message distribution processor receives an application service data message; by analyzing the received application service data message, the message distribution processor determines that the application service corresponding to the application service data message is an application service i; in addition, by querying the correspondence information between the application services and the user mode protocol stacks, the message distribution processor determines that the user mode protocol stack corresponding to the application service i is a user mode protocol stack j; and thus, the message distribution processor determines that the received application service data message corresponds to the user mode protocol stack j.

In some embodiments, the correspondence between the application services and the user mode protocol stacks may be a one-to-one correspondence, i.e., one application service corresponds to one user mode protocol stack. The correspondence may be alternatively a one-to-many correspondence, i.e., one application service corresponds to multiple user mode protocol stacks.

If there is a one-to-one correspondence between the application services and the user mode protocol stacks respectively, the user mode protocol stacks may be set to be equal to application services in number. That is, the number of the user mode protocol stacks is the same as the number of the application services. For example, an application service 1 corresponds to a user mode protocol stack 1; an application service 2 corresponds to a user mode protocol stack 2; . . . , and an application service n corresponds to a user mode protocol stack n. Since each user mode protocol stack corresponds to one respective instance, each application service corresponds to the one instance of the user mode protocol stack. In this way, message processing can be performed by instances belonging to different user mode protocol stacks, thereby avoiding mutual exclusion of resources and improving the performance of the application service.

If there is a one-to-many correspondence between the application services and the user mode protocol stacks, each application service may correspond to multiple user mode protocol stacks (this above description is from the perspective of the application service; alternatively, multiple different application services may correspond to one user mode protocol stack). For example, an application service 1 corresponds to a user mode protocol stack 1, a user mode protocol stack 3, and a user mode protocol stack 5. Since each user mode protocol stack corresponds to one instance, each application service corresponds to multiple instances of the multiple user mode protocol stacks. In this way, message processing can be performed by instances belonging to different user mode protocol stacks, thereby avoiding mutual exclusion of resources and improving the performance of the application service.

In the step S203: the method includes processing, by the instance of the user mode protocol stack, the received application service data message and sending the processed message to an application service corresponding to the user mode protocol stack.

As described above, the instance of the user mode protocol stack refers to a thread or process operating on a user mode protocol stack. Taking a thread as an example, a thread is the smallest unit that can perform operation scheduling in an operating system and is included in the process as the actual operating unit therein. A thread refers to a single-order control flow in the process. One process can have multiple threads concurrently, and each thread executes a different task in parallel. After the message distribution processor submits the application service data message to the instance of the user mode protocol stack, the instance processes the message. After the instance of the user mode protocol stack processes the message, the instance then sends the message to the application service corresponding to the user mode protocol stack.

In the embodiments of the specification, each instance corresponds to a user mode protocol stack, such that when the instances process messages, the messages can be processed based on resources of different user mode protocol stacks. Therefore, mutual exclusion of the resources due to the fact that multiple instances belong to the same user mode protocol stack is avoided, and the heterogeneous ability is improved. Moreover, the instances belong to different user mode protocol stacks respectively, thereby enabling a suitable user mode protocol stack to be selected for an application service, and improving the performance of the application service.

Figure 3:
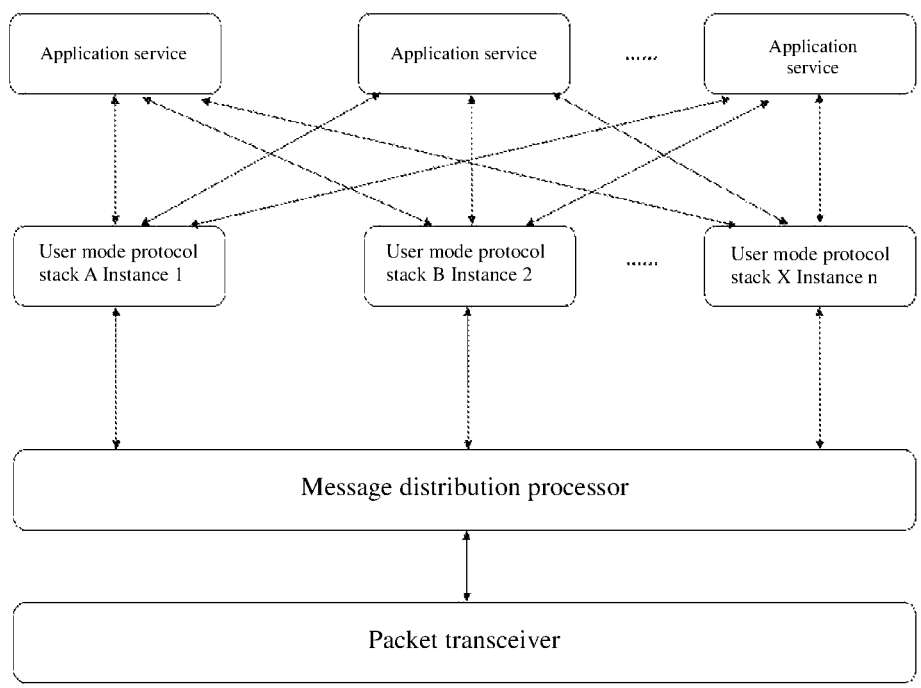
FIG. 3 shows a schematic diagram of a system for message distribution based on a user mode protocol stack according to some embodiments of the specification.

FIG. 3 shows a schematic diagram of a system for message distribution based on a user mode protocol stack according to some embodiments of the specification. The system comprises a message transceiver, a message distribution processor, multiple user mode protocol stacks, and one or more application services, where each of the multiple user mode protocol stacks corresponds to one instance.

The message transceiver is configured to receive and send messages.

The message distribution processor classifies the messages so as to determine a user mode protocol stack suitable for the message type, so as to distribute various messages to instances of the corresponding user mode protocol stacks.

The user mode protocol stacks may comprise a user mode protocol stack A, a user mode protocol stack B, . . . , and a user mode protocol stack X, where each of the user mode protocol stacks corresponds to one instance; and the instances are represented as an instance 1, an instance 2, . . . , and an instance n respectively.

The one or more application services may be represented as an application service i, an application service j, . . . , and an application service k respectively. Each of the application services corresponds to one or more user mode protocol stacks. In FIG. 3, a correspondence between each application service and multiple user mode protocol stacks is illustrated. In the simplest correspondence, each application service may be set to correspond to one user mode protocol stack.

The embodiments of the specification are introduced below with respect to the two aspects: receiving and sending a message by the message transceiver.

1. Message Receiving 1.1 The message transceiver submits the received messages to the message distribution processor.

1.2 The message distribution processor classifies the messages into application service data messages and protocol data messages according to a field in the content of the messages. In some embodiments, an application service data message includes a data message to be processed by the application service and a correspondingly connected protocol message, and a protocol data message refers to any non-application service data message.

1.3 With regard to the application service data message, the message distribution processor determines a corresponding user mode protocol stack thereto. For example, the message distribution processor is configured to receive an application service data message from the message transceiver, and determining, from multiple user mode protocol stacks, a user mode protocol stack corresponding to the application service data message so as to send the application service data message to an instance of the determined user mode protocol stack.

In some embodiments, the user mode protocol stack corresponding to the application service data message is determined by the following steps: computing a hash value of a field in the application service data message and obtaining a mapping number corresponding to a user mode protocol stack by using the hash value, and determining the user mode protocol stack corresponding to the mapping number. A mapping number may be a preset number of a user mode protocol stack corresponding to an application service. Since an application service corresponding to the application service data message can be obtained by analyzing the fields in the application service data message, the mapping number of the user mode protocol stack corresponding to the application service can be determined through the above-described method, thereby achieving the matching of a user mode protocol stack to a corresponding application service data message.

In some embodiments, when the preset correspondence between the application service and the user mode protocol stack is a one-to-one correspondence, a hash value of an IP 5-tuple in the application service data message is computed, where an IP 5-tuple refers to a set of five different features or values that identify a TCP/IP connection. For example, the IP 5-tuple may include a source IP address/port number, destination IP address/port number and the protocol in use; and the mapping number of the user mode protocol stack in one-to-one correspondence with the application service is obtained by using the hash value; and finally, the user mode protocol stack corresponding to the mapping number is determined. For example, the hash value of the IP 5-tuple in the application service data message is computed at first; and then a modulo operation is performed on the number of instances of the user mode protocol stacks by using the hash value to obtain the mapping numbers in one-to-one correspondence with the instances of the protocol stacks; and finally, the application service data message is delivered to the instance of the corresponding user mode protocol stack according to the mapping number to perform a subsequent processing.

In other embodiments, when the preset correspondence between the application service and the user mode protocol stack is a one-to-many correspondence, a hash value of a port number (or other fields) in the application service data message is computed at first; and then multiple mapping numbers of multiple user mode protocol stacks corresponding to the application service are obtained by using the hash value; and finally, the multiple user mode protocol stacks corresponding to the multiple mapping numbers are determined.

The embodiments of the specification do not limit which type of field is used to determine a mapping number of a user mode protocol stack corresponding to a message. The above-described manners with respect to IP 5-tuple and port number are merely provided as examples, and the manners should not be limited to these two manners.

1.4 For a protocol data message, in order to maintain the minimum requirement for keeping a protocol stack instance operational, the message distribution processor may process Address Resolution Protocol (ARP) messages. For example, an ARP request message may be randomly submitted to an instance of the user mode protocol stack to perform a subsequent processing; with regard to an ARP response message or a free ARP message, the message may be duplicated for a respective instance of each user mode protocol stack and the destination link addresses of the duplicated messages may be modified as broadcast addresses; and these duplicated messages may be delivered to the instances of the corresponding user mode protocol stacks to perform a subsequent processing.

1.5 No matter which type of message submitted by the message distribution processor is received by the instance of the user mode protocol stack, the message is processed according to a normal process. For example, when receiving the application service data message, the instance of the user mode protocol stack processes the application service data message and sends the processed message to the application service corresponding to the user mode protocol stack.

2. Message Sending Direction 2.1 Both an application service data message sent by the application service via the instance of the user mode protocol stack and a protocol data message (such as an ARP message) generated by the instance of the user mode protocol stack itself are processed by the instance of the user mode protocol stack according to a normal process, and are submitted to the message distribution processor.

2.2 After receiving a message from the instance of the user mode protocol stack, the message distribution processor submits the message to the message transceiver.

2.3 After receiving the message from the message distribution processor, the message transceiver sends the message.

Figure 4:
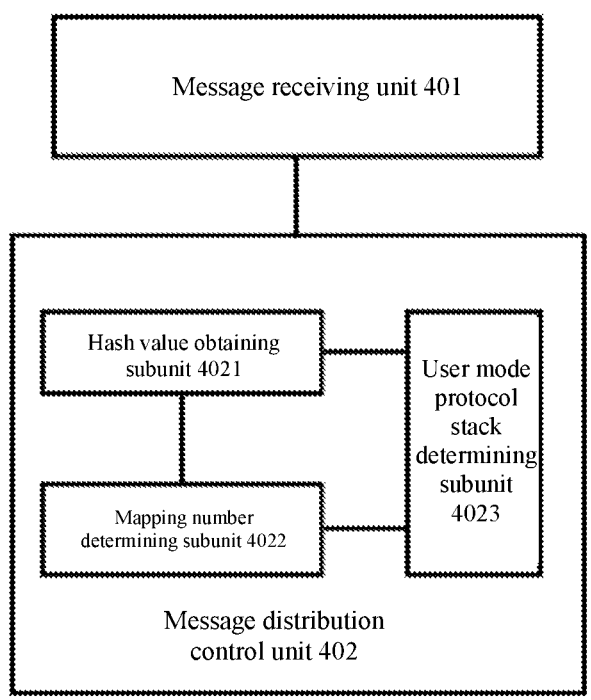
FIG. 4 shows a schematic structural diagram of an apparatus for message distribution based on a user mode protocol stack according to some embodiments of the specification.

Based on the same inventive concept, the embodiments of the specification provide an apparatus for message distribution based on a user mode protocol stack (which may correspond to the above-described message distribution processor or to a part of the above-described message distribution processor). Referring to FIG. 4, the apparatus comprises: a message receiving unit 401, configured to receive an application service data message from a message transceiver; and a message distribution control unit 402, configured to determine, from multiple user mode protocol stacks, a user mode protocol stack corresponding to the application service data message so as to send the application service data message to an instance of the determined user mode protocol stack, where each user mode protocol stack corresponds to one instance.

In some embodiments, the message distribution control unit 402 is configured to: determine an application service corresponding to the application service data message, and obtain a user mode protocol stack corresponding to the application service data message according to a preset correspondence between the application service and the user mode protocol stack.

In some embodiments, the message distribution control unit 402 comprises: a hash value obtaining subunit 4021, configured to compute a hash value for a field in the application service data message; a mapping number determining subunit 4022, configured to obtain a mapping number corresponding to a user mode protocol stack by using the hash value; and a user mode protocol stack determining subunit 4023, configured to determine the user mode protocol stack corresponding to the mapping number.

In some embodiments, the preset correspondence between the application service and the user mode protocol stack is a one-to-one correspondence; and the hash value obtaining subunit 4021 is configured to compute a hash value for a field in the application service data message.

In some embodiments, the preset correspondence between the application service and the user mode protocol stack is a one-to-many correspondence; the hash value obtaining subunit 4021 is configured to compute a hash value of a port number in the application service data message; the mapping number determining subunit 4022 is configured to obtain multiple mapping numbers of multiple user mode protocol stacks corresponding to the application service by using the hash value; and the user mode protocol stack determining subunit 4023 is configured to determine the multiple user mode protocol stacks corresponding to the multiple mapping numbers.

In some embodiments, the message receiving unit 401 is further configured to receive an ARP data message from a message transceiver; and the message distribution control unit 402 is further configured to randomly submit the ARP request message to an instance of any user mode protocol stack for processing; and if the ARP data message is an ARP response message or a free ARP message, duplicate the ARP response message or the free ARP message for an instance of each user mode protocol stack, and modify destination link addresses of the duplicated messages as broadcast addresses.

Based on the same inventive concept of the method for message distribution based on a user mode protocol stack in the above-described embodiments, the embodiments of the specification provide a server. As show in FIG. 5, the server comprises a memory 504, a processor 502, and a computer program that is stored in the memory 504 and executable by the processor 502; the processor 502, when executing the program, implements steps of any above-described method for message distribution based on a user mode protocol stack.

Figure 5:
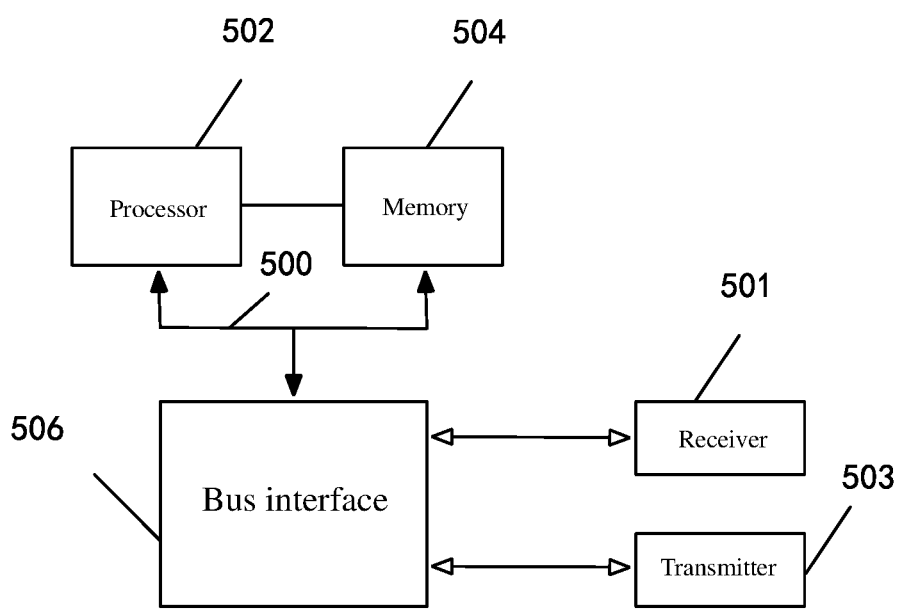
FIG. 5 shows a schematic structural diagram of a server for message distribution based on a user mode protocol stack according to some embodiments of the specification.

In FIG. 5, a bus architecture is represented by a bus 500. The bus 500 may comprise any number of interconnected buses and bridges, and link together various circuits of one or more processors represented by the processor 502 and a memory represented by the memory 504. The bus 500 may further link together various other circuits such as a peripheral device circuit, a voltage stabilizer circuit, and a power management circuit, which are not described further herein. A bus interface 506 provides an interface among the bus 500, a receiver 501 and a transmitter 503. The receiver 501 and the transmitter 503 may be the same element, namely a transceiver, to act as a unit for communicating with various other apparatuses on a transmission medium. The processor 502 is responsible for managing the bus 500 and general processing, and the memory 504 may be used to store data used by the processor 502 when performing operations.

Based on the same inventive concept of the method for message distribution based on a user mode protocol stack in the above-described embodiment, the embodiments of the specification provide a computer-readable storage medium storing a computer program; and the program, when being executed by a processor, implements steps of any above-described method for message distribution based on a user mode protocol stack.

The present description is described with reference to the flow charts and/or block diagrams of the method, device (system), and computer program product according to the embodiments of the specification. It should be understood that each flow and/or block in the flow charts and/or the block diagrams, and a combination of the flows and/or the blocks in the flow charts and/or the block diagrams can be implemented via computer program instructions. The computer program instructions may also be loaded onto a general-purpose computer, a specialized computer, an embedded processor, or the processors of other programmable data processing devices to produce a computer such that the instructions which are executed on the computer or other processors of the programmable device generate an apparatus for implementing the functions specified in one or more flows in a flow chart and/or one or more blocks in a block diagram.

The computer program instructions can also be stored in a computer readable memory which can boot a computer or other programmable data processing devices to operate in some manner, such that the instructions stored in the computer readable memory generate a product comprising an instruction apparatus, where the instruction apparatus is configured to realize the functions specified in one or more flows in a flow chart and/or one or more blocks in a block diagram.

The computer program instructions can also be loaded to a computer or other programmable data processing devices, so as to execute a series of operation steps on the computer or the other programmable devices to generate a computer reliable process, such that the instructions executed on the computer or the other programmable devices can provide steps for implementing the functions specified in one or more flows in a flow chart and/or one or more blocks in a block diagram.

Although some embodiments of the specification have been described, those skilled in the art may make other changes and modifications to these described embodiments once they know the basic inventive concept. Therefore, the attached claims are intended to be interpreted to include the described embodiments, and all changes and modifications to the described embodiments which fall within the scope of the specification.

Those skilled in the art may make various modifications and variations to the specification without departing from the spirit and scope of the specification. In this way, if these modifications and variations of the specification fall within the scope of the claims of the specification and their equivalent technologies, the specification is also intended to include these modifications and variations.

The invention claimed is:

1. A method for message distribution based on a user mode protocol stack, comprising:
   receiving a data message from a message transceiver;
   determining whether the received data message is an application service data message or a protocol data message;
   in response to determining the received data message is an application service data message:
      determining, from a plurality of user mode protocol stacks, a user mode protocol stack corresponding to the received application service data message according to correspondences between a plurality of application services and the plurality of user mode protocol stacks, wherein each of the plurality of user mode protocol stacks corresponds to an instance, and
      sending the application service data message to an instance of the determined user mode protocol stack, to cause the instance of the determined user mode protocol stack to process the received application service data message and to send the processed application service data message to an application service corresponding to the determined user mode protocol stack; and
   in response to determining the received data message is a protocol data message:
      randomly submitting the received data message to an instance of a user mode protocol stack to cause the instance of the user mode protocol stack to process the received data message.

2. The method according to claim 1, further comprising:
   pre-setting a plurality of mapping numbers for the plurality of user mode protocol stacks corresponding to the plurality of application services.

3. The method according to claim 2, wherein determining, from a plurality of user mode protocol stacks, a user mode protocol stack corresponding to the received application service data message according to correspondences between a plurality of application services and the plurality of user mode protocol stacks comprises:
   computing a hash value of a field in the application service data message;
   obtaining a mapping number of a user mode protocol stack based on the hash value; and determining, from the plurality of user mode protocol stacks, the user mode protocol stack corresponding to the application service data message based on the obtained mapping number and the plurality of pre-set mapping numbers of the plurality of user mode protocol stacks.

4. The method according to claim 2, wherein determining, from a plurality of user mode protocol stacks, a user mode protocol stack corresponding to the received application service data message according to correspondences between a plurality of application services and the plurality of user mode protocol stacks comprises:
computing a hash value for an IP 5-tuple in the application service data message;
obtaining a mapping number based on the hash value; and
determining, from the plurality of user mode protocol stacks, the user mode protocol stack corresponding to the application service data message based on the obtained mapping number and the plurality of pre-set mapping numbers of the plurality of user mode protocol stacks.

5. The method according to claim 2, wherein determining, from a plurality of user mode protocol stacks, a user mode protocol stack corresponding to the received application service data message according to correspondences between a plurality of application services and the plurality of user mode protocol stacks comprises:
computing a hash value for a port number in the application service data message;
obtaining a plurality of mapping numbers based on the hash value; and
determining, from the plurality of user mode protocol stacks, a plurality of target user mode protocol stacks corresponding to the application service data message based on the obtained mapping numbers and the plurality of pre-set mapping numbers of the plurality of user mode protocol stacks.

6. The method according to claim 1, further comprising:
receiving an Address Resolution Protocol (ARP) data message from the message transceiver;
if the ARP data message is an ARP request message, randomly submitting the ARP request message to an instance of any of the plurality of user mode protocol stacks for processing; and
if the ARP data message is an ARP response message or a free ARP message, for an instance of each of the plurality of user mode protocol stacks, duplicating the ARP response message or the free ARP message and modifying a destination link address of the duplicated ARP response message or free ARP message to be a broadcast address.

7. The method according to claim 1, wherein determining, from a plurality of user mode protocol stacks, a user mode protocol stack corresponding to the received application service data message according to correspondences between a plurality of application services and the plurality of user mode protocol stacks comprises:
determining an application service corresponding to the received application service data message.

8. A system for message distribution, comprising: one or more processors and one or more non-transitory computer-readable memories coupled to the one or more processors and configured with instructions executable by the one or more processors to cause the system to perform operations comprising:
receiving a data message from a message transceiver;
determining whether the received data message is an application service data message or a protocol data message;
in response to determining the received data message is an application service data message:
determining, from a plurality of user mode protocol stacks, a user mode protocol stack corresponding to the received application service data message according to correspondences between a plurality of application services and the plurality of user mode protocol stacks, wherein each of the plurality of user mode protocol stacks corresponds to an instance, and
sending the application service data message to an instance of the determined user mode protocol stack, to cause the instance of the determined user mode protocol stack to process the received application service data message and to send the processed application service data message to an application service corresponding to the determined user mode protocol stack; and
in response to determining the received data message is a protocol data message:
randomly submitting the received data message to an instance of a user mode protocol stack to cause the instance of the user mode protocol stack to process the received data message.

9. The system according to claim 8, wherein the operations further comprise:
pre-setting a plurality of mapping numbers for the plurality of user mode protocol stacks corresponding to the plurality of application services.

10. The system according to claim 9, wherein determining, from a plurality of user mode protocol stacks, a user mode protocol stack corresponding to the received application service data message according to correspondences between a plurality of application services and the plurality of user mode protocol stacks comprises:
computing a hash value of a field in the application service data message;
obtaining a mapping number of a user mode protocol stack based on the hash value; and
determining, from the plurality of user mode protocol stacks, the user mode protocol stack corresponding to the application service data message based on the obtained mapping number and the plurality of pre-set mapping numbers of the plurality of user mode protocol stacks.

11. The system according to claim 9, wherein determining, from a plurality of user mode protocol stacks, a user mode protocol stack corresponding to the received application service data message according to correspondences between a plurality of application services and the plurality of user mode protocol stacks comprises:
computing a hash value for an IP 5-tuple in the application service data message;
obtaining a mapping number based on the hash value; and
determining, from the plurality of user mode protocol stacks, the user mode protocol stack corresponding to the application service data message based on the obtained mapping number and the plurality of pre-set mapping numbers of the plurality of user mode protocol stacks.

12. The system according to claim 9, wherein determining, from a plurality of user mode protocol stacks, a user mode protocol stack corresponding to the received application service data message according to correspondences between a plurality of application services and the plurality of user mode protocol stacks comprises:
  computing a hash value for a port number in the application service data message;
  obtaining a plurality of mapping numbers based on the hash value; and
  determining, from the plurality of user mode protocol stacks, a plurality of target user mode protocol stacks corresponding to the application service data message based on the obtained mapping numbers and the plurality of pre-set mapping numbers of the plurality of user mode protocol stacks.

13. The system according to claim 8, wherein the operations further comprise:
  receiving an Address Resolution Protocol (ARP) data message from the message transceiver;
  if the ARP data message is an ARP request message, randomly submitting the ARP request message to an instance of any of the plurality of user mode protocol stacks for processing; and
  if the ARP data message is an ARP response message or a free ARP message, for an instance of each of the plurality of user mode protocol stacks, duplicating the ARP response message or the free ARP message and modifying a destination link address of the duplicated ARP response message or free ARP message to be a broadcast address.

14. The system according to claim 8, wherein determining, from a plurality of user mode protocol stacks, a user mode protocol stack corresponding to the received application service data message according to correspondences between a plurality of application services and the plurality of user mode protocol stacks comprises:
  determining an application service corresponding to the received application service data message.

15. A non-transitory computer-readable storage medium configured with instructions executable by one or more processors to cause the one or more processors to perform operations comprising:
  receiving a data message from a message transceiver;
  determining whether the received data message is an application service data message or a protocol data message;
  in response to determining the received data message is an application service data message:
    determining, from a plurality of user mode protocol stacks, a user mode protocol stack corresponding to the received application service data message according to correspondences between a plurality of application services and the plurality of user mode protocol stacks, wherein each of the plurality of user mode protocol stacks corresponds to an instance, and
    sending the application service data message to an instance of the determined user mode protocol stack, to cause the instance of the determined user mode protocol stack to process the received application service data message and to send the processed application service data message to an application service corresponding to the determined user mode protocol stack; and
  in response to determining the received data message is a protocol data message:
    randomly submitting the received data message to an instance of a user mode protocol stack to cause the instance of the user mode protocol stack to process the received data message.

16. The non-transitory computer-readable storage medium according to claim 15, wherein the operations further comprise:
  pre-setting a plurality of mapping numbers for the plurality of user mode protocol stacks corresponding to the plurality of application services.

17. The non-transitory computer-readable storage medium according to claim 16, wherein determining, from a plurality of user mode protocol stacks, a user mode protocol stack corresponding to the received application service data message according to correspondences between a plurality of application services and the plurality of user mode protocol stacks comprises:
  computing a hash value of a field in the application service data message;
  obtaining a mapping number of a user mode protocol stack based on the hash value; and
  determining, from the plurality of user mode protocol stacks, the user mode protocol stack corresponding to the application service data message based on the obtained mapping number and the plurality of pre-set mapping numbers of the plurality of user mode protocol stacks.

18. The non-transitory computer-readable storage medium according to claim 16, wherein determining, from a plurality of user mode protocol stacks, a user mode protocol stack corresponding to the received application service data message according to correspondences between a plurality of application services and the plurality of user mode protocol stacks comprises:
  computing a hash value for an IP 5-tuple in the application service data message;
  obtaining a mapping number based on the hash value; and
  determining, from the plurality of user mode protocol stacks, the user mode protocol stack corresponding to the application service data message based on the obtained mapping number and the plurality of pre-set mapping numbers of the plurality of user mode protocol stacks.

19. The non-transitory computer-readable storage medium according to claim 16, wherein determining, from a plurality of user mode protocol stacks, a user mode protocol stack corresponding to the received application service data message according to correspondences between a plurality of application services and the plurality of user mode protocol stacks comprises:
  computing a hash value for a port number in the application service data message;
  obtaining a plurality of mapping numbers based on the hash value; and
  determining, from the plurality of user mode protocol stacks, a plurality of target user mode protocol stacks corresponding to the application service data message based on the obtained mapping numbers and the plurality of pre-set mapping numbers of the plurality of user mode protocol stacks.

20. The non-transitory computer-readable storage medium according to claim 15, wherein the operations further comprise:
  receiving an Address Resolution Protocol (ARP) data message from the message transceiver;
  if the ARP data message is an ARP request message, randomly submitting the ARP request message to an instance of any of the plurality of user mode protocol stacks for processing; and
  if the ARP data message is an ARP response message or a free ARP message, for an instance of each of the plurality of user mode protocol stacks, duplicating the ARP response message or the free ARP message and modifying a destination link address of the duplicated ARP response message or free ARP message to be a broadcast address.

* * * * *